(12) United States Patent
Dobrowolski

(10) Patent No.: US 7,154,730 B2
(45) Date of Patent: Dec. 26, 2006

(54) HIGH VOLTAGE GENERATOR FOR ELECTROSTATIC PAINTING EQUIPMENT

(75) Inventor: Flavien Dobrowolski, Sinard (FR)

(73) Assignee: Eisenmann France Sarl (FR)

( * ) Notice: Subject to any disclaimer, the term of this patent is extended or adjusted under 35 U.S.C. 154(b) by 230 days.

(21) Appl. No.: 10/433,263

(22) PCT Filed: Dec. 17, 2001

(86) PCT No.: PCT/FR01/04023

§ 371 (c)(1),
(2), (4) Date: Oct. 1, 2003

(87) PCT Pub. No.: WO02/50988

PCT Pub. Date: Jun. 27, 2002

(65) Prior Publication Data

US 2004/0057258 A1    Mar. 25, 2004

(30) Foreign Application Priority Data

Dec. 18, 2000  (FR)  .................................. 00 16525

(51) Int. Cl.
H05B 5/03 (2006.01)
(52) U.S. Cl. ................................... 361/227
(58) Field of Classification Search ................ 361/227, 361/226; 363/59
See application file for complete search history.

(56) References Cited

U.S. PATENT DOCUMENTS

| | | | |
|---|---|---|---|
| 3,608,823 A | 9/1971 | Buschor | |
| 3,731,145 A | 5/1973 | Senay | |
| 4,050,005 A | 9/1977 | Maginness | |
| 4,993,645 A * | 2/1991 | Buschor | 239/708 |
| 5,022,590 A * | 6/1991 | Buschor | 239/708 |
| 5,067,434 A | 11/1991 | Thuer et al. | |
| 5,272,612 A * | 12/1993 | Harada et al. | 363/8 |
| 5,703,770 A * | 12/1997 | Burtin et al. | 363/61 |
| 6,790,285 B1 * | 9/2004 | Matsumoto | 118/707 |

FOREIGN PATENT DOCUMENTS

DE    12 59 452    1/1968

OTHER PUBLICATIONS

International Search Report; PCT/FR01/04023; Apr. 29, 2002.

* cited by examiner

*Primary Examiner*—Brian Sircus
*Assistant Examiner*—Boris Benenson
(74) *Attorney, Agent, or Firm*—Cantor Colburn LLP

(57) ABSTRACT

A generator is provided inside equipment, such as a sprayer, having a high voltage cascade including a voltage-gain transformer and a voltage multiplier arranged at the output of the transformer. The transformer is a double or multiple transformer, including at least two elementary transformers, whereof respective primary windings are mounted electrically in parallel, and whereof respective secondary windings are mounted electrically in series, the arrangement reducing a diameter of the cascade to facilitate incorporation in the sprayer or other equipment. The invention is applicable to painting robots for the automotive industry.

4 Claims, 3 Drawing Sheets

Figure 2:
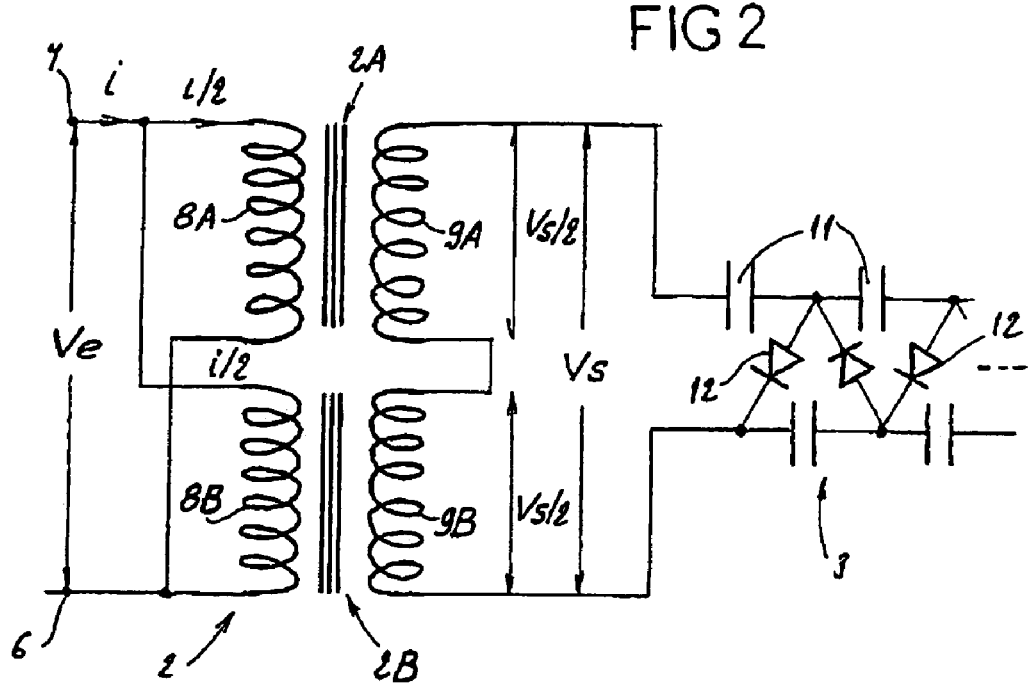

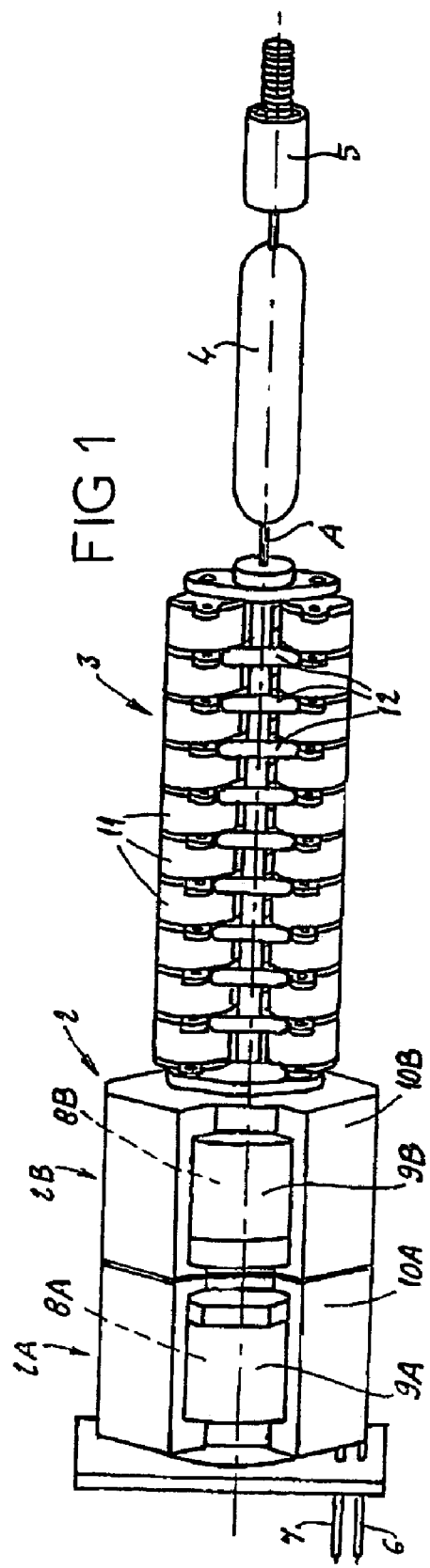
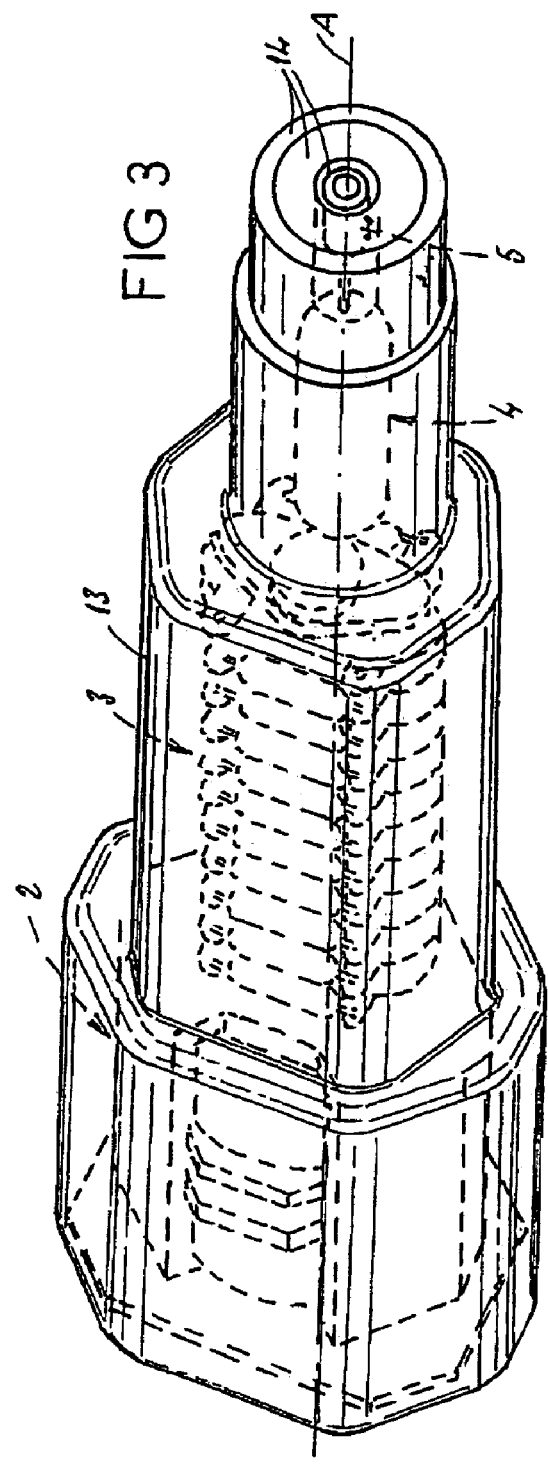

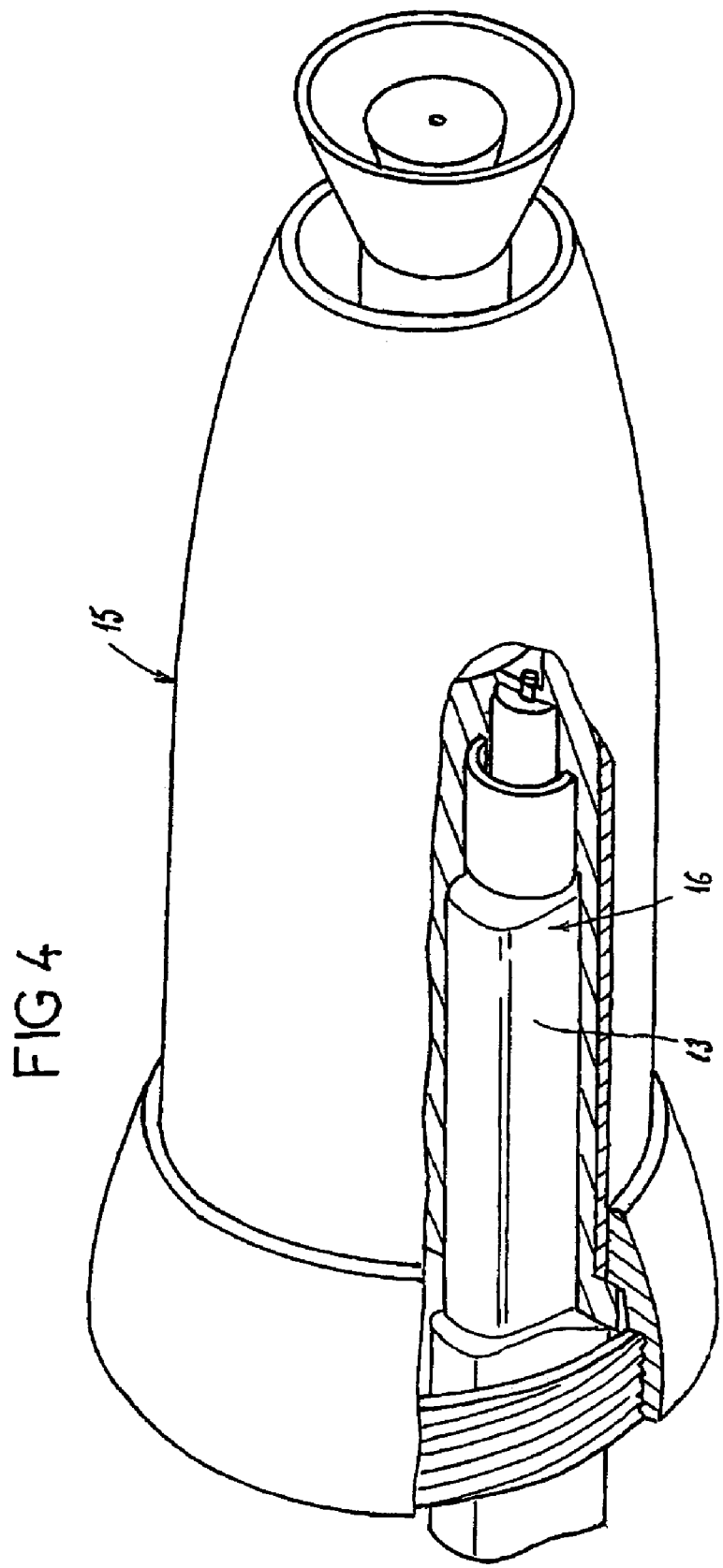

HIGH VOLTAGE GENERATOR FOR ELECTROSTATIC PAINTING EQUIPMENT

TECHNICAL FIELD OF THE INVENTION

The invention relates, in a general manner, to electrostatic painting equipment, such as sprayers used on painting robots, in the automotive industry. More particularly, this invention concerns an assembly for generating high electrical voltage, capable of generating a high voltage (typically of several tens of kilovolts) applied to the electrode of such electrostatic painting equipment, with the aim of electrically charging the paint, so as to improve the efficiency of deposition of this painting equipment and the quality of paint application.

DESCRIPTION OF RELATED ART

Such devices are known, for example, through the documents U.S. Pat. No. 3,608,823 A, U.S. Pat. No. 3,731,145 A and U.S. Pat. No. 5,067,434 A.

These devices generally consist of the combination of an electronic control unit, generating an AC voltage of variable amplitude and variable frequency, the so-called "low voltage", and of a "cascade" comprising in particular a transformer and a voltage multiplier.

The electronic control unit delivers, in general, a substantially sinusoidal, low AC voltage whose frequency is of the order of a few tens of kilohertz (in particular lying between 20 and 50 kHz) and whose amplitude (peak-to-peak) is of the order of a few tens of volts.

The transformer customarily has a turns ratio of around 100, and its output voltage is of the order of 10 000 volts (peak-to-peak). The multiplier consists of rectifier stages each comprising a capacitor and a diode, two consecutive stages being mounted in series in such a way as to double the peak voltage emanating from the transformer.

The trend in the art of paint sprayers is moving toward, on the one hand, greatly reducing their bulkiness, and in particular their outside diameter, so as to reduce the soiling caused by the excess paint sprayed in the painting booth.

However, on the other hand, the standards in force, in Europe and in the U.S.A., are currently making it necessary to integrate the high voltage "cascade" into the sprayers, so as to minimize the stored electrical energy which is liable to be discharged in the event of sparkover. More precisely, according to the currently applicable standards, the energy liberated during a sparkover must be less than 0.24 millijoules, for solvent-based liquid paints, and be less than 5 millijoules for powder paint, so as not to cause ignition. Hence, the energy in the high voltage "cascade", as well as in the sprayer itself, must be minimized.

These requirements have already led to the high voltage, "cascade" being placed inside the sprayer, given that, if this "cascade" is situated outside, it has to be linked to the sprayer by a high voltage cable, which is by nature capacitive, and which would store up too much energy.

The housing of the high voltage "cascades" inside the sprayers leads to the reducing of their dimensions, and in particular of their cross section. In order to maintain the appropriate insulation distances, for high voltages of the order of 100 kV, between the electrode of the sprayer and the "low voltage" side of the "cascade", a minimum distance, of the order of some twenty centimeters, is necessary. The "cascade" must therefore be designed in such a way as to extend lengthwise along the sprayer. Stated otherwise, for a "cascade" of given volume, it is better for it to possess a greater length and a smaller cross section.

This requirement results also from the diameters of the sprayers being ever smaller, as already indicated above, these sprayers still having to house other components: valves, various ducts (air, solvent, paint), motor, turbine, device for measuring turbine speed (for example by optical fiber).

The total length of the sprayers must however remain reasonable, since this length has an influence on the total width of the painting booths.

The cluttering of the voltage multiplier with a high voltage "cascade", consisting of stages with capacitor and diode, may be reduced to the maximum extent by placing the diodes as near as possible to the capacitors, and by reducing the diameters of the capacitors.

However, in dealing with capacitors whose dielectric consists of a ceramic disk, the value of the capacitance of these capacitors is given by the formula: $C = \in \times d/s$, where:

$\in$ is the dielectric constant of the ceramic, d is the height of the ceramic disk, s is the cross section of the ceramic disk.

By applying this formula, it is noted that, for a given dielectric constant of the ceramic, a decrease in the cross section of the ceramic disk leads to an increase in the value of the capacitance, and hence of the stored energy, this being detrimental to safety as already discussed above. Moreover, it is necessary to use, for the capacitors, a ceramic whose dielectric constant is as stable as possible as a function of temperature, thus leaving a limited choice of materials, and hence of the factor $\in$.

Additionally, the voltage multiplier is not, currently, the part of the high voltage "cascade" having the largest cross section, the transformer customarily possessing a greater cross section. Thus, solely reducing the diameter of the capacitors of the voltage multiplier is not sufficient to solve the problem posed here, and it would also be necessary to intervene on the transformer.

The transformer remains, however, the most difficult part to implement, and in particular to miniaturize, while retaining the power required here, of the order of 15 VA, with a turns ratio of the order of 100.

The primary of the transformer is determined in such a way as to have a minimum magnetic induction of the order of 0.1 to 0.2 teslars, so as to minimize the iron losses, given by the formula: Piron (B)–$B^{(2+x)}$ with: $0 \leq x \leq 1$. This makes it necessary to have a large number $N_1$ of turns at the primary of the transformer, by applying the formula: $B \sim 1/N_1$. Consequently, and in view of the desired turns ratio, the secondary of the transformer must comprise several thousand turns.

The turns of the primary are, in general, situated in the heart of the transformer, while the turns of the secondary are arranged as several layers, toward the outside. This involves large total transformer cross sections.

It is also advisable to minimize the overall losses in the transformer, which losses are made up in particular of the copper losses and of the iron losses.

The copper losses depend on the resistance of the primary winding and on the resistance of the secondary winding. Each of these resistances depends on the total length of the winding and on the cross section of the wire which constitutes this winding. Thus, a smaller wire cross section entails a larger resistance, for equal length, and consequently higher copper losses. Likewise, an increase in the number of turns increases the total length of the winding, hence the copper losses. Simply decreasing the wire cross section, or increasing the number of turns, do not therefore constitute satisfactory solutions per se.

As far as the iron losses are concerned, these depend on the magnetic induction, as already explained above, and also on the frequency and the nature of the magnetic material used to conduct the magnetic flux, as well as the overall volume of this material. In order to operate at a frequency of a few tens of kilohertz, one uses ferrites, here chosen from among the various kinds and forms of ferrites conventionally used in the field of electronics, to conduct the magnetic flux. In this regard, likewise, the current solutions are not satisfactory; in particular, a typical known implementation consists of a transformer wound on a cylindrical ferrite core, which does not close up the magnetic flux, so that the output voltage decreases as the current increases; the efficiency of deposition of the paint, which depends on this output voltage, also diminishes with increasing current.

Similar problems, in particular of a dimensional nature, also arise in the case of handheld guns for paint spraying.

SUMMARY OF INVENTION

The present invention aims to solve all the problems set forth above, by proposing a high voltage "cascade" implementation which is improved also in its "transformer" part, in such a way as to allow an appreciable reduction in diameter of the "cascade", facilitating its incorporation into the sprayer or other equipment, while retaining the power required and improving the operating conditions of the assembly.

For this purpose, the subject of the invention is essentially a high voltage-generator for electrostatic painting equipment, said generator comprising in particular, housed inside the equipment, a high voltage "cascade" comprising on the one hand a voltage booster transformer, and on the other hand a voltage multiplier placed at the output of the transformer, this generator being characterized in that said transformer consists of a double or multiple transformer, made up of at least two elementary transformers, whose respective primary windings are mounted electrically in parallel, and whose respective secondary windings are mounted electrically in series, the series mounting of the secondary windings providing an output voltage, the sum of the voltages across the terminals of each of the secondary windings, and which is the input voltage of the voltage multiplier.

For example, to implement the equivalent of a single transformer whose turns ratio is equal to 100, the invention can be employed by combining two elementary transformers, each of ratio equal to 50, the respective primaries of the two elementary transformers being mounted in parallel and energized thus, both, by the low voltage, while the respective secondaries of these two elementary transformers, mounted in series, provide an appropriate output voltage (double the voltage across the terminals of each secondary) across the terminals of this series mounting, said output voltage being the input voltage of the voltage multiplier.

The generator, which is the subject of the invention, is thus characterized by the particular combination of two or more elementary transformers in the high voltage "cascade". A preferred form of implementation of the invention provides for these two or more elementary transformers to be arranged coaxially, following one another, in such a way that the maximum diameter or the maximum cross section of the "cascade" is not greater than the diameter or than the cross section of each elementary transformer.

Advantageously, each elementary transformer is a transformer of cylindrical or substantially cylindrical outside shape, with a pot-shaped ferrite part, ensuring magnetic flux closure.

Thus, for each of the elementary transformers, the number of turns of the secondary is divided by the number of elementary transformers (by comparison with the current solution with a single transformer). Certainly, the invention leads to an increase in the number of primaries but, all the primaries being mounted electrically in parallel, the electric current flowing through them is divided, and it is thus possible to implement them with a smaller wire cross section. Moreover, in an elementary transformer of smaller overall cross section, the turns of the primary are less "buried" (situated at depth) and can benefit from more satisfactory thermal exchange. Additionally, the potential difference between turns, and between layers of turns, at the secondary, is smaller since the overall potential between the input and the output of the secondary winding of each elementary transformer is divided by the number of elementary transformers, equal for example to 2 or 3. This makes it possible to reduce the tolerances in respect of the leakage lines of the windings, and to fill in the window of the ferrite part in an optimal manner.

All these elements make it possible to reduce the cross section of the elementary transformers, hence the cross section of the "cascade" itself, insofar as this cross section is determined essentially by that, of the "transformer" part, and as the elementary transformers, for example two or three in number, are preferably arranged coaxially.

According to a complementary characteristic of the invention, in order that the reduction in the dimensions of the high voltage "cascade" is not accompanied by a disadvantageous decrease in the insulation distance, provision is made for the "high voltage" side connection of the generator to be effected through an arrangement of baffles, making it possible to lengthen the insulation distance of the high voltage with respect to ground, without however increasing the geometrical length of the "cascade" and without requiring any additional item.

Overall, one thus obtains the high voltage "cascade" that can be readily incorporated into a handheld paint gun or sprayer, even with a reduced diameter, without this requiring an undesirable lengthening of the sprayer or gun.

BRIEF DESCRIPTION OF THE DRAWINGS

The invention will be better understood with the aid of the description which follows, with reference to the appended schematic drawing representing, by way of examples, a few embodiments of this high voltage generator for electrostatic painting equipment:

FIG. 1 represents, in perspective, a high voltage "cascade" of such a generator, with its various constituent elements;

FIG. 2 is a circuit diagram of the transformer of the "cascade" of FIG. 1;

FIG. 3 represents in perspective the same "cascade" molded in an insulating resin;

FIG. 4 is a perspective view, simplified, of a paint sprayer into which such a "cascade" is integrated;

FIG. 5 illustrates, in circuit diagram form, a variant of the transformer.

DETAILED DESCRIPTION OF THE INVENTION

FIG. 1 represents a high voltage "cascade", with its constituents, arranged in line along one and the same central axis A, which are successively: a "transformer" part 2, a voltage multiplier 3, a current limiting resistor 4, and a high voltage contact 5, all these components being connected together, mechanically and electrically. The assembly is energized electrically, on the transformer 2 side, with an AC voltage provided by an electronic control unit (not represented), this "low voltage" being brought to input terminals 6 and 7.

According to the invention, and in the example illustrated here in FIGS. 1 and 2, the voltage booster transformer 2 is a double transformer, composed of two elementary transformers 2A and 2B, of identical structure, stationed side by side.

In detail, and as shown more particularly in FIG. 2, the first elementary transformer 2A possesses a primary winding 8A and a secondary winding 9A; the two windings 8A and 9A are coiled around the central core of a ferrite pot 10A, for example of the so-called "RM" type, which allows the magnetic flux to close up. Similarly, the second elementary transformer 2B possesses a primary winding 8B and a secondary winding 9B; the two windings 8B and 9B are coiled around the central core of a ferrite pot 10B, which allows the magnetic flux to close up.

From the two input terminals 6 and 7, the respective primary windings 8A and 8B of the two elementary transformers 2A and 2B are mounted electrically in parallel, so that each primary winding 8A or 8B is energized under the same input voltage Ve, but is traversed by a current of strength i/2 equal to half the strength i of the current delivered by the control electronics.

On the other hand, the respective secondary windings 9A and 9B of the two elementary transformers 2A and 2B are mounted electrically in series, so that the voltage across the terminals of each secondary winding 9A or 9B is equal to half, i.e. Vs/2, the output voltage Vs of the transformer part 2.

This transformer part 2 possesses, typically, a turns ratio equal to 100, that is to say its output voltage Vs is equal to 100 times its input voltage Ve. To achieve this result, it is advisable for each elementary transformer 2A or 2B to possess a turns ratio equal to 50, this determining the ratio of the numbers of turns of the primary coils 8A, 8B and secondary coils 9A, 9B of these elementary transformers 2A and 2B.

The output voltage Vs of the transformer part 2 is again multiplied, by the desired factor equal, for example to 20, in the voltage multiplier 3 which, in a manner known per se, comprises a series of rectifier stages with capacitors 11 and diodes 12, the voltage Vs constituting the input voltage of this voltage multiplier 3.

As shown in FIG. 3, the assembly of the previously described components is advantageously sunk into an embedding material 13, more particularly into an insulating resin. This embedding material 13 forms, in front of the "cascade", that is to say in the region of the high voltage contact 5, baffles 14 which make it possible to lengthen the insulation distance of the high voltage, without thereby increasing the total constructional length (along the axis A) of said "cascade".

The high voltage "cascade", implemented as has just been described, can be incorporated into an electrostatic paint sprayer 15, in the manner illustrated very schematically in FIG. 4, where this "cascade" is indicated, in its entirety, by the label 16. The cross section of the two elementary transformers 2A and 2B determines the maximum cross section of the "cascade" 16, it being possible here for this cross section to be maintained at a relatively small value. The sprayer 15 is carried by a painting robot, not represented.

Figure 5:
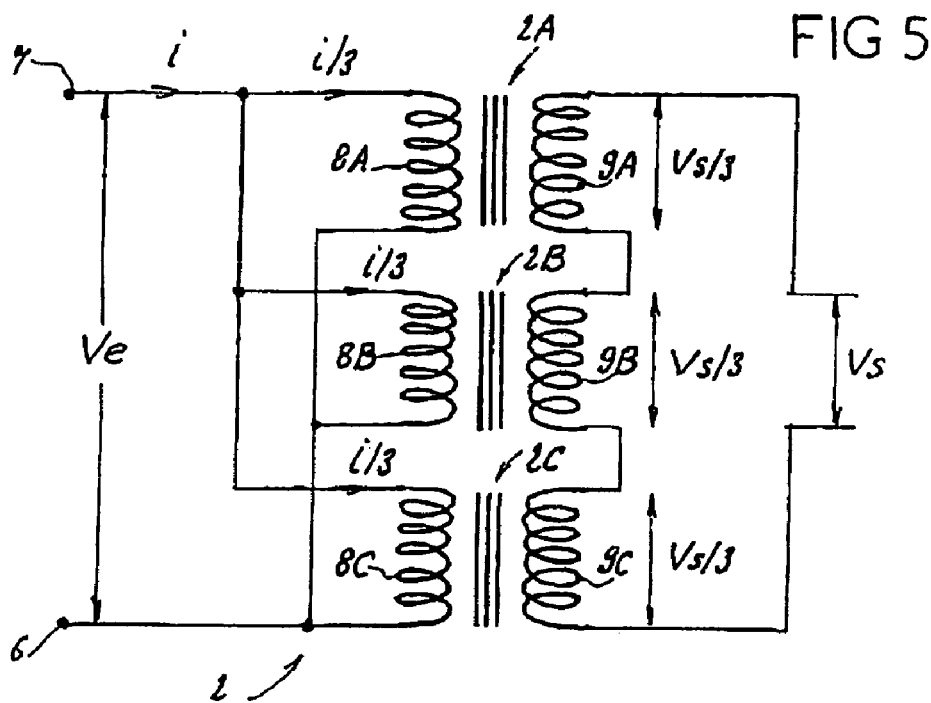

The number of elementary transformers, which make up the "transformer" part 2, may be greater than 2, this allowing an additional reduction in the maximum cross section of the "cascade". Thus, FIG. 5 illustrates a variant, in which this part 2 is made up of three elementary transformers 2A, 2B and 2C. The respective primary windings 8A, 8B and 8C of the three elementary transformers 2A, 2B and 2C are mounted in parallel, hence each energized under the input voltage Ve. The respective secondary windings 9A, 9B and 9C of these three elementary transformers 2A, 2B and 2C are mounted in series, the voltage across the terminals of each of them being equal to a third (Vs/3) of the output voltage Vs.

The number of elementary transformers of the "cascade", or their multiplication ratio, or else the number of stages of the voltage multiplier, may naturally be modified without departing from the scope of the invention. With the same idea in mind, the invention is applicable not only to paint sprayers carried by painting robots, but also to handheld paint guns, and to other similar equipment. Finally, the high voltage generator, which is the subject of the present invention, is equally applicable to equipment for powder paint as to equipment for liquid paint.

The invention claimed is:

1. A high voltage generator for electrostatic painting equipment comprising: a high voltage cascade housed inside the equipment including a voltage booster transformer and a voltage booster multiplier placed at an output of the transformer, wherein said transformer comprises at least two elementary transformers having respective primary windings mounted electrically in parallel and respective secondary windings mounted electrically in series, the series mounting of the secondary windings providing an output voltage, the sum of the voltages across terminals of each of the secondary windings, which is an input voltage of the voltage multiplier, and wherein the two or more elementary transformers are arranged coaxially, following one another, in such a way that a maximum diameter or a maximum cross section of the "cascade" is not greater than a diameter or a cross section of each elementary transformer.

2. The high voltage generator as claimed in claim 1, wherein each elementary transformer is a transformer of substantially cylindrical outside shape, with a pot-shaped ferrite part, ensuring magnetic flux closure.

3. The high voltage generator as claimed in claim 1, wherein a high voltage side connection of the generator is effected through an arrangement of baffles, making it possible to lengthen an insulation distance of the high voltage with respect to ground.

4. The high voltage generator as claimed in claim 1, wherein the painting equipment is an electrostatic paint sprayer carried by a painting robot.

* * * * *